(12) United States Patent
Davenport et al.

(10) Patent No.: US 6,245,694 B1
(45) Date of Patent: *Jun. 12, 2001

(54) STATIC DISSIPATIVE AUTOMOTIVE BEDLINERS

(75) Inventors: Grover L. Davenport; Wayne S. Stanko, both of Asheville, NC (US); Allen Ray, Atlanta, GA (US); Everett C. Cox, Anderson, SC (US); Michael A. Davis, Asheville; Gary M. Carnes, Fletcher, both of NC (US)

(73) Assignee: Shakespeare Conductive Fibers, LLC, Columbia, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,357

(22) Filed: Oct. 1, 1997

(51) Int. Cl.$^7$ .............................. B32B 33/00; B32B 27/04
(52) U.S. Cl. .................... 442/110; 428/368; 428/372; 428/395; 428/922; 442/111; 296/39.1; 296/39.2
(58) Field of Search ........................... 428/368, 372, 428/395, 922; 427/122, 180, 393.1; 296/39.1, 39.2; 442/110, 111

(56) References Cited

U.S. PATENT DOCUMENTS

| | | | |
|---|---|---|---|
| 3,823,035 | 7/1974 | Sanders | 428/368 |
| 4,084,031 * | 4/1978 | Barsy | 428/95 |
| 4,228,194 * | 10/1980 | Meeder | 428/288 |
| 4,255,487 * | 3/1981 | Sanders | 428/368 |
| 4,590,120 * | 5/1986 | Klein | 428/247 |
| 4,704,311 | 11/1987 | Pickering et al. | 427/393.1 |
| 5,009,946 | 4/1991 | Hatomoto et al. | 428/87 |
| 5,308,563 | 5/1994 | Hodan et al. | 264/103 |
| 5,368,913 | 11/1994 | Ortega | 428/198 |
| 5,436,803 | 7/1995 | Annis et al. | 361/818 |
| 5,525,411 | 6/1996 | Stewart et al. | 442/56 |
| 5,722,711 * | 3/1998 | German | 296/39.2 |

* cited by examiner

Primary Examiner—Elizabeth M. Cole
Assistant Examiner—John J. Guarriello
(74) Attorney, Agent, or Firm—Renner, Kenner, Greive, Bobak, Taylor & Weber

(57) ABSTRACT

Automotive bedliners (e.g., for pickup trucks) are formed from a sheet of thermoplastic material having electrically conductive fibers embedded in a surface thereof in an amount sufficient to render said sheet electrically conductive. The bedliners are most preferably formed of a thermoplastic material (e.g., a polyolefin, such a polyethylene and/or polypropylene) having a matrix of electrically conductive fibers physically embedded in at least one side thereof. By physically embedding the conductive fibers in a surface of the bedliner, the fibers are capable of establishing electrical continuity between the bedliner and the pickup truck bed thereby effectively dissipating static electrical charges.

17 Claims, 1 Drawing Sheet

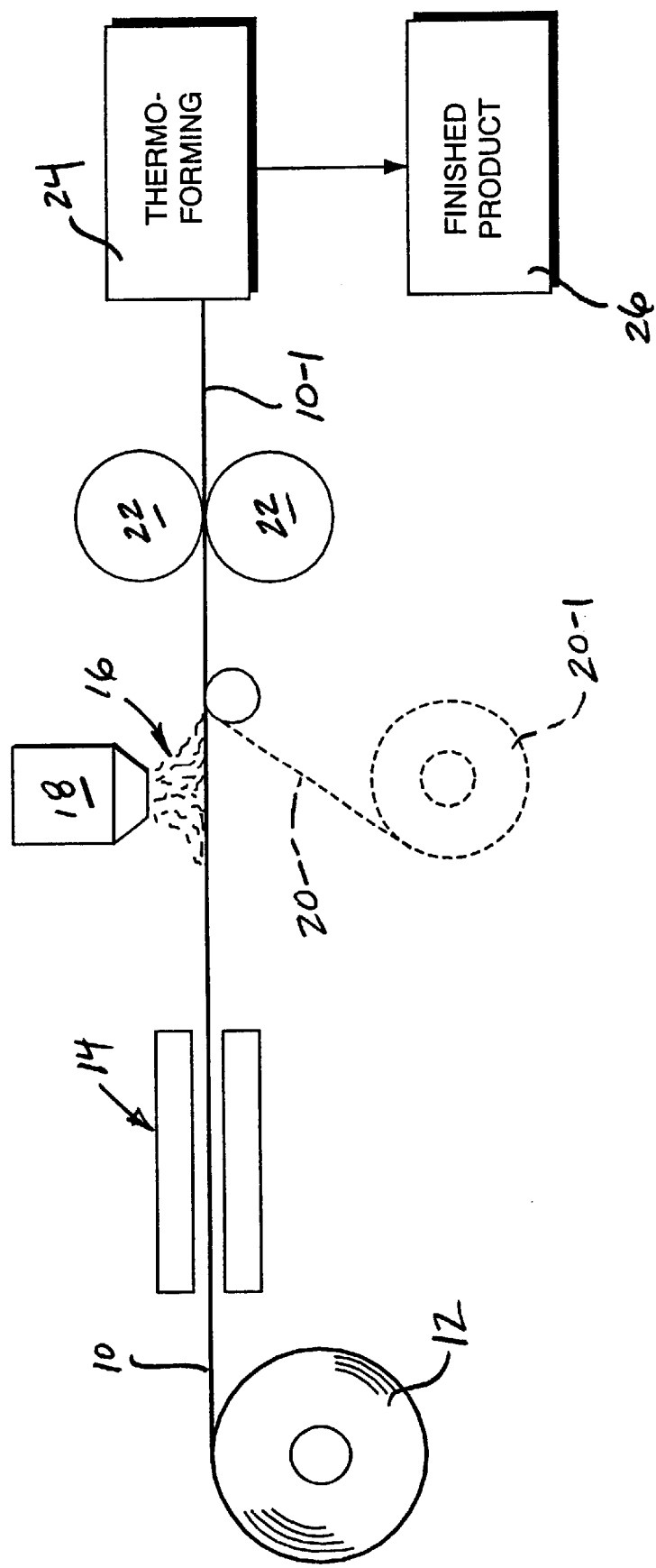

STATIC DISSIPATIVE AUTOMOTIVE BEDLINERS

FIELD OF THE INVENTION

The present invention relates generally to the field of automotive bedliners, particularly bedliners for pickup trucks. In preferred forms, the present invention is embodied in bedliners having the ability to dissipate static electricity.

BACKGROUND AND SUMMARY OF THE INVENTION

Pickup truck bedliners formed of polyolefins (e.g., polyethylene, polypropylene and the like) are well known and have achieved widespread commercial popularity as a means to prevent a pickup truck's bed from becoming marred when hauling cargo. Recently, however, the electrically insulating properties of such polyolefin bedliners has been identified as a possible hazard when handling flammable fluids on or near a bedliner-equipped pickup truck. Specifically, it has been suggested that the risk of static discharges is significantly greater for pickup trucks equipped with polyolefin bedliners since static charges cannot dissipate over the entire area of the painted aluminum bed surface, as would otherwise occur if the electrically insulative bedliner was not present. Therefore, operators of pickup trucks with such electrically insulative bedliners must use extreme caution when handling flammable fluids on or near the truck bed.

Thermoplastic compositions having electrically conductive filler materials (e.g., carbon black, graphite and the like) blended therewithin are also well known. However, in order to obtain the necessary electrical conductivity sufficient to dissipate static electrical charges, the electrically conductive filler materials must be blended in such large amounts that deleteriously affect the mechanical properties of the resulting thermoplastic composition. As a result, such electrically conductive thermoplastic materials are not suitable for use in forming automotive bedliners, especially bedliners for use with pickup trucks.

It would therefore be highly desirable if automotive bedliners formed of thermoplastic materials were provided which are sufficiently electrically conductive (i.e., so as to allow static electrical charges) to be dissipated, but which maintain their desirable mechanical properties. It is towards fulfilling such a need that the present invention is directed.

Broadly, the present invention is embodied in automotive bedliners formed of a thermoplastic material (e.g., a polyolefin, such a polyethylene and/or polypropylene) having a matrix of electrically conductive fibers physically embedded in at least one side thereof. By physically embedding the conductive fibers in a surface of the bedliner, the fibers are capable of establishing electrical continuity between the bedliner and the pickup truck bed thereby effectively dissipating static electrical charges and preventing undesirable (and potentially hazardous) discharges.

These and other aspects and advantages of the present invention will become more clear from the following detailed description of the following preferred exemplary embodiment of the present invention.

BRIEF DESCRIPTION OF THE ACCOMPANYING DRAWINGS

Reference will hereinafter be made to the following drawing FIGURE which is a schematic diagram depicting the processing steps employed to form an exemplary bedliner in accordance with this invention.

DETAILED DESCRIPTION OF THE INVENTION

The term "fiber" as used herein and in the accompanying claims, is meant to include fibers of extreme or indefinite length (filaments) and fibers of short length (staple). In addition, as used herein, the term "conductive fiber" means a fiber having electrical resistance of less than about $10^9$ ohms/cm, and more preferably between about $10^4$ ohms/cm to about $10^9$ ohms/cm.

Virtually any electrically conductive fiber may be employed in the practice of this invention. Most preferably, however, are the electrically conductive antistatic fibers disclosed in U.S. Pat. Nos. 3,823,035, 4,255,487, 4,545,835 and 4,704,311, the entire content of each being expressly incorporated hereinto by reference. Such antistatic fibers are most preferably comprised of a filamentary polymer substrate having electrically conductive particles suffused into the surface thereof. The most preferred electrically conductive particles include carbon black having a average particle size of 20 to about 40 m$\mu$ and are suffused into the surface of the polymer filamentary substrate so as to be present in an amount between about 2 to about 20 wt. %, based on the total weight of the electrically conductive antistatic fiber. The electrically conductive particles are most preferably suffused radially inwardly to about $\frac{1}{10}^{th}$ the radius of a circle inscribed within the cross-sectional perimeter of the filament. As such, an outer annular region (which may be circular or noncircular in cross-section) comprised of the suffused electrically conductive particles is established.

The filamentary polymer substrate into which the electrically conductive particles are suffused may be prepared from any well known fiber-forming polymeric material, such as cellulosics, acrylics, modacrylics, polystyrenes, polyolefins, polyesters, or polyamides. Preferably, the fibers are monofilamentary polyamides, for example, nylon, with nylon-6 being especially preferred. The fibers will typically have deniers from about 1 to about 100, and more typically between about 5 to about 50.

The accompanying drawing FIGURE depicts one possible process for forming the pickup truck bedliners according to the present invention. In this regard, a sheet of thermoplastic bedliner material 10 (e.g., a polyolefin, such a polyethylene and/or polypropylene) is fed from roll 12 into proximity with a heater 14 and softened to just below its melt point (e.g., to within less than about 15° C., and typically within less than about 10° C., of the melt point of the bedliner material 10. The residence time of the sheet of bedliner material 10 in proximity to the heater 14 is dependent upon the particular type of thermoplastic material being used and its thickness. In this regard, the thickness of the sheet of thermoplastic material 10 is typically less than about 0.5 inch, and usually about 0.25 inch. The technical front side of the sheet 10 is usually embossed with a pattern while the technical back side of the sheet 10 is smooth.

Staple electrically conductive fibers 16 may then be deposited by a hopper feeder 18 onto a surface of the softened sheet material 10. Alternatively (or additionally), a knitted, woven or non-woven fabric or scrim 20 which includes a sufficient amount of electrically conductive fiber may be unrolled from supply roll 20-1 and brought into contact with a softened surface of the sheet material 10. The sheet material 10 bearing the electrically conductive fibers will then pass through the nip of a pair of press rollers 22. The press rollers 22 serve to physically embed the conductive fibers into the surface of the sheet material 10 to such an extent that the fibers are physically surrounded by the thermoplastic material forming the sheet 10, but insufficient so that portions of the conductive fibers remain exposed (i.e., so they may contact the bed of the pickup truck and thereby establish an electrical path therebetween).

The sheet of thermoplastic material with the electrically conductive fibers embedded therein (now designated in the drawing FIGURE by reference numeral 10-1) is passed on to a conventional thermoforming apparatus 24 where bedliners of appropriate shape and geometry are formed using vacuum molds. The thermoformed sheet is then cut and sold as finished product—namely, as static charge dissipative truck bedliners—in step 26.

The amount of electrically conductive fibers that is embedded in the thermoplastic sheet material is such that the resulting sheet will exhibit an electrical resistance of less than $10^{12}$ ohms/square, and typically less than about $10^8$ ohms/square. In this regard, when carbon suffused electrically conductive fibers are employed, they will be present in an amount between about 0.02 to about 0.10 percent by weight, based on the total weight of the static dissipative bedliner (that is, the combination of the thermoplastic bedliner material and the electrically conductive fiber embedded in a surface thereof). Most preferably, the electrically conductive fibers are embedded on the technical back side of the bedliner—that is, the side of the bedliner that comes into contact with the truck bed—so that the embossed pattern on the front side of the sheet need not be disturbed.

A further understanding of this invention is available from the following non-limiting example thereof.

EXAMPLE

A loose mat was prepared from 22 denier (50 micron diameter) continuous filament nylon with carbon black suffused into the surface to render the fibers conductive. The average resistivity of the fibers was $2 \times 10^5$ ohms/cm. The mat of conductive fibers was placed on the back side of a 3"×6" sheet of bedliner high density polyethylene bedliner material. The bedliner material contained enough carbon black blended therewith to impart a black color thereto, but insufficient to impart electrical conductivity. The fibers and sheet were placed between two aluminum plates. The entire assembly was heated in an oven at 195° C. for ten minutes. Immediately after removal from the oven, a ten pound weight was placed on the assembly. The result was a sheet of bedliner material with conductive fibers embedded into the back side of the bedliner.

The conductivity was tested with a model number BD-50E heavy duty spark tester obtained from Electro-Technic Products, Inc. The voltage level on the spark tester was set at the maximum (50,000 volts). As the tip of the spark tester was brought close to the upper surface of the original bedliner material containing no conductive fibers, no spark was observed indicating a nonconductive material. However, for the bedliner material with conductive fibers on the back, a continuous spark was observed when the spark tester was placed just above the top surface indicating that the bedliner/conductive fiber combination was conductive.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An automotive cargo bed which includes an electrically conductive cargo bedliner in contact with said cargo bed for dissipating static electrical charges, said bedliner comprising:

a sheet of thermoplastic material having a technical back side in contact against the automotive cargo bed, and a technical front side opposite said technical back side thereof; and electrically conductive fibers embedded in the technical back side of the sheet in an amount to render the sheet electrically conductive and to an extent that the fibers are substantially absent from said technical front side of the sheet, wherein said fibers are physically surrounded by the thermoplastic material forming the technical back side of the sheet such that portions of the fibers remain exposed at said technical back side of the sheet to make contact with the automotive cargo bed; and wherein said electrically conductive fibers include a filamentary polymeric substrate with electrically conductive particles suffused in a peripheral annular region thereof.

2. The cargo bed of claim 1, wherein said electrically conductive fibers have a resistivity of less than about $10^9$ ohms/cm.

3. The cargo bed of claim 1, wherein said electrically conductive fibers have a resistivity of between about $10^4$ to about $10^9$ ohms/cm.

4. The cargo bed of claim 1, wherein said electrically conductive fibers include carbon black particles suffused in said peripheral annular region of said filamentary polymeric substrate.

5. The cargo bed of claim 1, wherein said filamentary polymeric substrate of said electrically conductive fibers is selected from cellulosics, acrylics, modacrylics, polystyrenes, polyolefins, polyesters, or polyamides.

6. The cargo bed of claim 1, wherein said filamentary polymeric substrate is a polyamide.

7. The cargo bed of claim 6, wherein said filamentary polymeric substrate is nylon-6.

8. The cargo bed of claim 1, wherein said electrically conductive fibers are present in an amount sufficient to impart an electrical resistivity to the cargo bed of less than about $10^{12}$ ohms/square.

9. The cargo bed of claim 8, wherein said electrically conductive fibers are formed of nylon-6 having carbon black particles suffused in a peripheral annular region thereof, and wherein said electrically conductive fibers are present in said bedliner in an amount between about 0.02 to about 0.10 percent by weight, based on the total weight of the bedliner.

10. The cargo bed of claim 1, wherein said electrically conductive fibers are staple fibers.

11. The cargo bed of claim 1, wherein said electrically conductive fibers are continuous filaments of indefinite length.

12. The cargo bed of claim 11, wherein said electrically conductive fibers are present in a fabric which is embedded in said sheet.

13. The cargo bed of claim 12, wherein said fabric is woven or knit.

14. The cargo bed of claim 11, wherein said electrically conductive fibers are part of a non-woven fabric embedded in said sheet.

15. A bedliner for an automotive cargo bed comprising:

a sheet of thermoplastic material having a technical back side for placement against the automotive cargo bed, and a technical front side opposite thereto; and electrically conductive fibers embedded in the technical back side of the sheet in an amount to render the sheet electrically conductive and to an extent that the fibers are substantially absent from said technical front side of the sheet, wherein said fibers are physically surrounded by the thermoplastic material forming the technical back side of the sheet such that portions of the fibers remain exposed at said technical back side of the sheet to make contact with the automotive cargo bed; and wherein said electrically conductive fibers include a filamentary polymeric substrate with electrically conductive particles suffused in a peripheral annular region thereof.

16. The bedliner of claim 15, wherein said electrically conductive fibers have a resistivity of between about $10^4$ to about $10^9$ ohms/cm.

17. The bedliner of claim 15 or 16, wherein said electrically conductive fibers include carbon black particles suffused in said peripheral annular region of said filamentary polymeric substrate.

* * * * *

UNITED STATES PATENT AND TRADEMARK OFFICE
CERTIFICATE OF CORRECTION

PATENT NO. : 6,245,694 B1
DATED : June 12, 2001
INVENTOR(S) : Davenport et al.

It is certified that error appears in the above-identified patent and that said Letters Patent is hereby corrected as shown below:

<u>Column 4,</u>
Line 38, replace the words "cargo bed" with the word -- bedliner --.

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*